United States Patent
Cook

(10) Patent No.: US 10,320,742 B2
(45) Date of Patent: Jun. 11, 2019

(54) ADDRESS ASSIGNMENT SYSTEM AND METHOD FOR SURGICAL LIGHTHEAD COMPONENTS

(71) Applicant: American Sterilizer Company, Mentor, OH (US)

(72) Inventor: Ian Hugh Cook, Willowick, OH (US)

(73) Assignee: American Sterilizer Company, Mentor, OH (US)

( * ) Notice: Subject to any disclaimer, the term of this patent is extended or adjusted under 35 U.S.C. 154(b) by 147 days.

(21) Appl. No.: 15/610,732

(22) Filed: Jun. 1, 2017

(65) Prior Publication Data

US 2018/0351906 A1 Dec. 6, 2018

(51) Int. Cl.
*H05B 37/02* (2006.01)
*H04L 29/12* (2006.01)
*G06F 3/06* (2006.01)

(52) U.S. Cl.
CPC .......... *H04L 61/2038* (2013.01); *G06F 3/061* (2013.01); *G06F 3/0655* (2013.01); *G06F 3/0688* (2013.01)

(58) Field of Classification Search
CPC ............. H04L 29/1232; H04L 61/2038; H04L 61/2092
USPC ........................................................ 709/222
See application file for complete search history.

(56) References Cited

U.S. PATENT DOCUMENTS

| | | | |
|---|---|---|---|
| 6,392,558 B1 | 5/2002 | Schulmeyer et al. | |
| 2005/0174473 A1* | 8/2005 | Morgan | H05B 33/0803 348/370 |
| 2006/0180746 A1 | 8/2006 | Muenter et al. | |
| 2011/0284637 A1 | 11/2011 | Powell et al. | |
| 2012/0212138 A1 | 8/2012 | Jungwirth et al. | |
| 2012/0271924 A1* | 10/2012 | Spitaels | H04L 61/2092 709/220 |
| 2014/0361696 A1 | 12/2014 | Siessegger et al. | |
| 2016/0040837 A1 | 2/2016 | Kallas et al. | |

FOREIGN PATENT DOCUMENTS

WO WO 2009/052023 A2 4/2009
WO WO 2017/024269 A1 2/2017

OTHER PUBLICATIONS

Park et al, "Calibration between Color Camera and 3D LIDAR Instruments with a Polygonal Planar Board," Sensors 2014, pp. 5333-5353, Mar. 17, 2018, http://www.mdpi.com/1424-8220/14/3/5333/pdf.

(Continued)

*Primary Examiner* — Douglas B Blair
*Assistant Examiner* — Jonathan A Sparks
(74) *Attorney, Agent, or Firm* — Kusner & Jaffe

(57) ABSTRACT

A method and apparatus for assigning addresses to components sharing a common bus. In one embodiment, an iterative elimination process is used to assign the addresses to each component. In another embodiment, each component includes a distance sensor that detects a distance to a front face of a calibration plank. Addresses are assigned to the components based upon the distance readings of the sensors.

12 Claims, 6 Drawing Sheets

(56) References Cited

OTHER PUBLICATIONS

Mathews et al., "Establishing Spatially Targeted Communication in a Heterogeneous Robot Swarm," Proc. of 9th Int. Conf. on Autonomous Agents and Multiagent Systems (AAMAS 2010), van der Hoek, Kaminka, Lespérance, Luck and Sen (eds.), May 10-14, 2010, Toronto, Canada, pp. 939-946.
Mathews et al., "Spatially Targeted Communication in Decentralized Multirobot Systems," Auton Robot (DOI 10.1007/s10514-015-9423-6), Springer Science+Business Media New York, Jan. 18, 2015, pp. 1-19.
Mathews et al., "Spatially Targeted Communication and Self-Assembly," 2012 IEEE/RSJ International Conference on Intelligent Robots and Systems, Oct. 7-12, 2012, Vilamoura, Algrave, Portugal, pp. 2678-2679.

\* cited by examiner

ADDRESS ASSIGNMENT SYSTEM AND METHOD FOR SURGICAL LIGHTHEAD COMPONENTS

FIELD OF THE INVENTION

The present invention relates generally to a system and method for address assignment, and more particularly, to a system and method for assigning addresses to components of a surgical lighthead that share a common communication bus.

BACKGROUND OF THE INVENTION

A typical computer system is comprised of a control system (e.g., microprocessor or microcontroller) and one or more components. The components are connected with the control system to allow the transfer of information (e.g., instructions and/or data) therebetween. In the implementation of some computer systems, each component is directly wired to the control system. Accordingly, a separate wired connection is provided for each component. This allows the control system to independently communicate with each component. However, separate wiring of each component to the control system can be complex, time consuming, and error prone.

In order to simplify the wiring, the control system and all the associated components are connected to a common bus (also referred to as a "shared bus"). When a common bus is used, each component must have an assigned address, so that each component can recognize which instructions from the control system are intended for that component. In other words, since all of the information communicated between the control system and the components travels through the common bus, each of the components must be able to distinguish which information is intended for that component.

In the implementation of some computer systems, jumpers and dip switches on each component are used to establish an address in a hardware setting for that component. For example, the jumpers or dip switches on a first component may be set to address 0001 to establish a first address, while the jumpers or dip switches on a second component may be set to address 0010, to establish a second address. However, if there are many components in the computer system, it can be time consuming to set jumpers or dip switch settings for each component. Also, an error in setting the jumpers or dip switches will result in malfunctioning of the computer system.

Surgical lighting systems used in a surgical suite are typically comprised of a computer system that includes a main computer control unit and one or more lightheads, wherein each lighthead has a plurality of light modules. Each light module may include a control unit, one or more LED strings, and one or more sensors (e.g., light sensors, distance sensors, and the like). In order to simplify the manufacturing process, the main computer control unit and the plurality of light modules may be connected to a common bus, as described above. For proper communication between the main computer control system and the light modules, each light module must have an assigned address for identifying a specific light module on the common bus. As indicated above, there are some significant drawbacks to using jumpers and/or dip switches to assign an assigned address to each component in hardware.

The present invention provides an address assignment system and method that overcomes these and other drawbacks of the prior art.

SUMMARY OF THE INVENTION

In accordance with the present invention, there is provided a method for assigning addresses to a plurality of components sharing a common bus, wherein each component has at least two operating states, said method comprising: (a) establishing all components needing an address assignment as active components; (b) selecting a target component among the plurality of components that is to be assigned an address for communication therewith; (c) setting all active components to a random state by transmitting an instruction to the plurality of components to select a random state; (d) detecting the current state of the target component, wherein the current state is established as state X; (e) deactivating all of the components that do not match state X, wherein deactivated components are removed from evaluation for address assignment; and (f) determining if the target component is the only remaining active component among the plurality of components, wherein (i) if the target component is the only remaining active component, then assigning an address to the target component, deactivating the target component, and repeating steps (a)-(f) for components still needing an address assignment, and (ii) if the target component is not the only remaining active component, then repeating steps (c)-(f).

In accordance with another aspect of the present invention, there is provided a method for assigning addresses to a plurality of components connected to a common bus, each component having a respective distance sensor, said method comprising: locating the sensors of the plurality of components relative to a calibration plank having a sloped front face, wherein each sensor is a different distance from the sloped front face; instructing the plurality of components to have the respective sensors take a distance reading indicative of the distance to the front face of the calibration plank; instructing the plurality of components to self-assign an address based upon the distance reading indicative of the distance to the front face of the calibration plank.

In accordance with still another aspect of the present invention, there is provided a system for assigning addresses to a plurality of light modules sharing a common bus, said system comprising: a calibration unit having a control system and a sensing device for detecting at least one lighting parameter of the plurality of light modules, the calibration unit programmed to: (a) establish all light modules needing an address assignment as active light modules; (b) select a target light module among the plurality of light modules that is to be assigned an address for communication therewith; (c) set all active light modules to a random state by transmitting an instruction to the plurality of light modules to select a random state, wherein each state includes one or more lighting parameters; (d) detect the current state of the target light module, wherein the current state is established as state X; (e) deactivate all of the light modules that do not match state X, wherein deactivated light modules are removed from evaluation for address assignment; and (f) determine if the target light module is the only remaining active light module among the plurality of light modules, wherein (i) if the target light module is the only remaining active light module, then assigning an address to the target light module, deactivating the target light module, and repeating steps (a)-(f) for light modules still needing an address assignment, and (ii) if the target light module is not the only remaining active light module, then repeating steps (c)-(f).

An advantage of the present invention is the provision of an address assignment system and method that is fast and accurate.

Another advantage of the present invention is the provision of an address assignment system and method that can be automated.

A still further advantage of the present invention is the provision of an address assignment system and method that facilitates the manufacture and servicing of devices having components that are connected to a common communication bus.

Yet another advantage of the present invention is the provision of an address assignment system and method that does not add complexity to existing devices in order to assign addresses.

These and other advantages will become apparent from the following description of illustrated embodiments taken together with the accompanying drawings and the appended claims.

BRIEF DESCRIPTION OF THE DRAWINGS

The invention may take physical form in certain parts and arrangement of parts, embodiments of which will be described in detail in the specification and illustrated in the accompanying drawings which form a part hereof, and wherein.

DETAILED DESCRIPTION OF THE INVENTION

Figure 1:
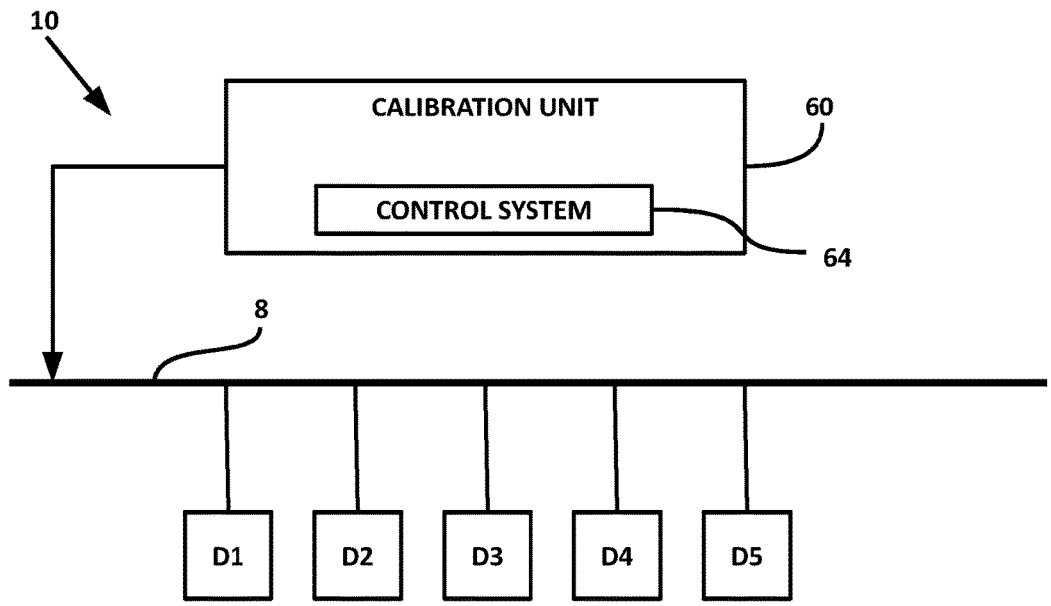
FIG. 1 is a block diagram of an address assignment system according to an embodiment of the present invention, for assigning addresses to a plurality of devices connected to a common bus.

Referring now to the drawings wherein the showings are for the purposes of illustrating an embodiment of the invention only and not for the purposes of limiting same, FIG. 1 shows a block diagram of an address assignment system 10 for assigning addresses to a plurality of devices D1-D5 that are connected to a common bus 8. This illustrated embodiment is a general application of the address assignment system of the present invention. Address assignment system 10 includes a calibration unit 60 having a control system 64. Control system 64 includes a microprocessor or microcontroller and memory storage. Calibration unit 60 is connected to common bus 8 to communicate with a plurality of devices D1-D5. Instructions and/or data transmitted via common bus 8 are used to assign addresses to each device D1-D5, as will be explained in detail with reference to the embodiments discussed below. The assignment of addresses allows each device D1-D5 to be identified in an instruction intended for that device, and allows each device to identify data transmitted by that device. In this way, information can be transmitted to a specific device, and each device can identify the information transmitted by that device.

Figure 2:
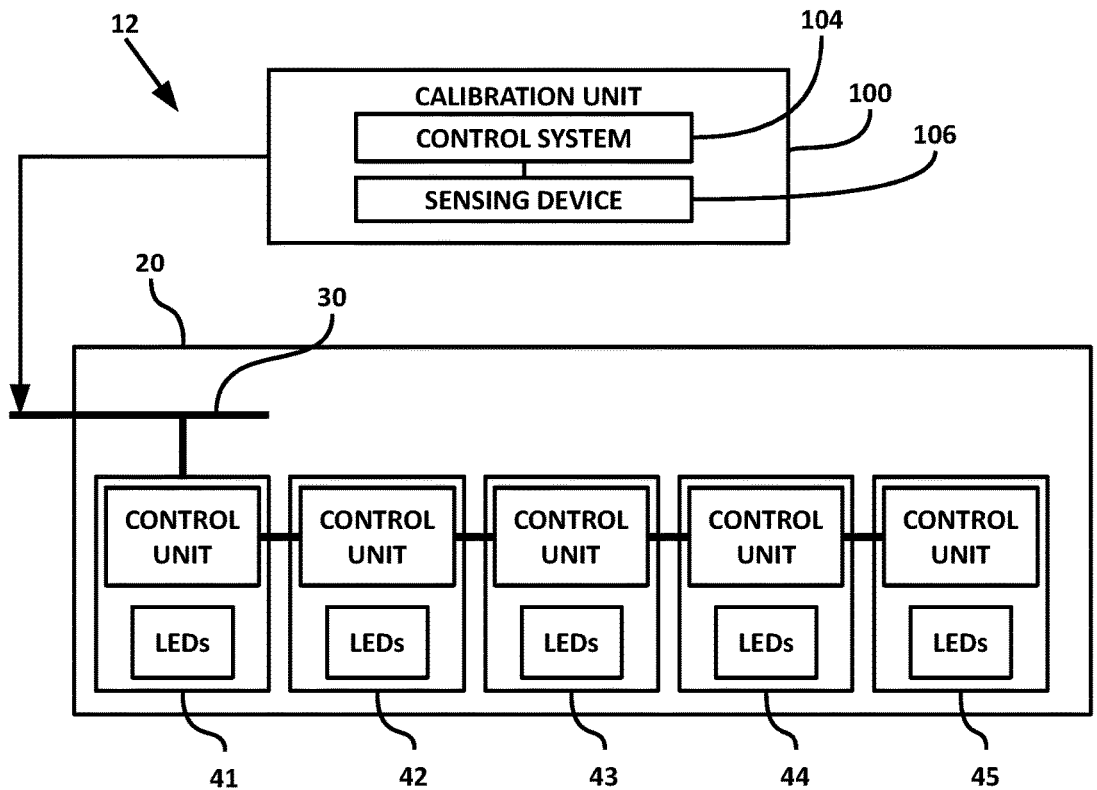
FIG. 2 is a block diagram of an address assignment system, according to an embodiment of the present invention, for assigning addresses to a plurality of light modules of a surgical lighthead that are connected to a common bus.

Referring now to FIG. 2, there is shown a block diagram of an address assignment system 12 for assigning addresses to a plurality of light modules 41-45 of a surgical lighthead 20 that are connected to a common bus 30. Address assignment system 12 is comprised of a calibration unit 100 that includes a control system 104 and a sensing device 106 connected thereto. Control system 104 is substantially the same as control system 64 described above. Sensing device 106 is used to detect the state of light modules, as will be described below. In the illustrated embodiment, sensing device 106 takes the form of a machine vision camera having one or more image sensors (e.g., CCD or CMOS image sensor).

Lighthead 20 includes a plurality of light modules 41-45. Each light module 41-45 includes a control unit and a plurality of LEDs (e.g., an LED string) connected thereto. Each control unit has a microcomputer or microcontroller, and memory storage. Light modules 41-45 may also include other components, including, but not limited to, an LED driver, a power regulation circuit, and one or more sensors (e.g., light and/or distance sensors). Each control unit controls lighting parameters of respective LEDs (e.g., light intensity, color, color temperature, and the like).

In an illustrated embodiment, light modules 41-45 are connected to common bus 30. More specifically, the control units of light modules 41-45 are connected to common bus 30 in a daisy chain wiring scheme. It is contemplated that light modules 41-45 may be connected to common bus 30 using alternative wiring configurations. Furthermore, it should be appreciated that the number of light modules shown in FIG. 2 is solely for the purpose of illustrating an embodiment of the present invention. Thus, it is contemplated that lighthead 20 may have a larger or smaller number of light modules.

Figure 3:
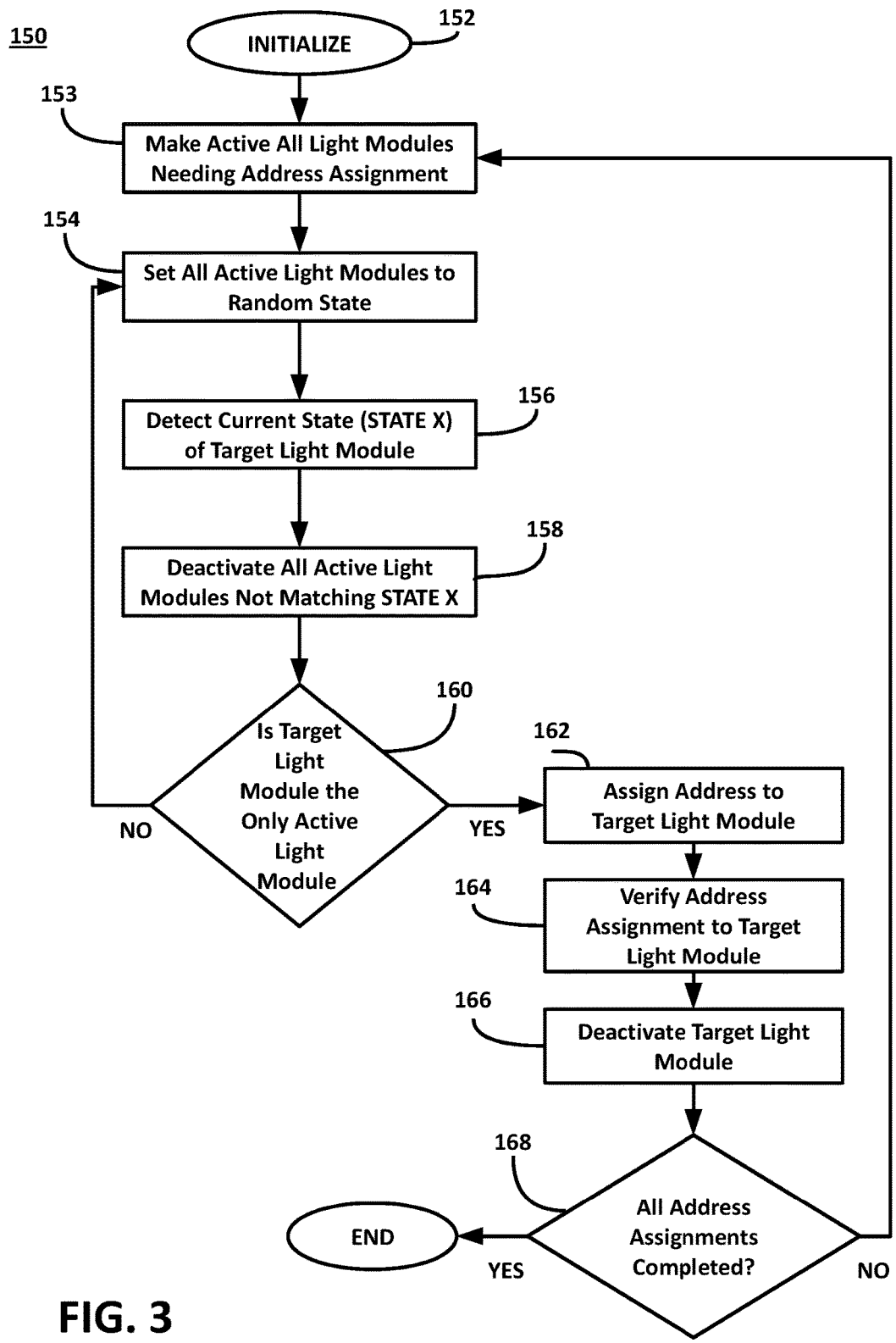
FIG. 3 is a flow chart of an address assignment method according to an embodiment of the present invention, the method using an iterative elimination process for assigning addresses to the plurality of light modules connected to the common bus, as shown in FIG. 2.
Figure 4:
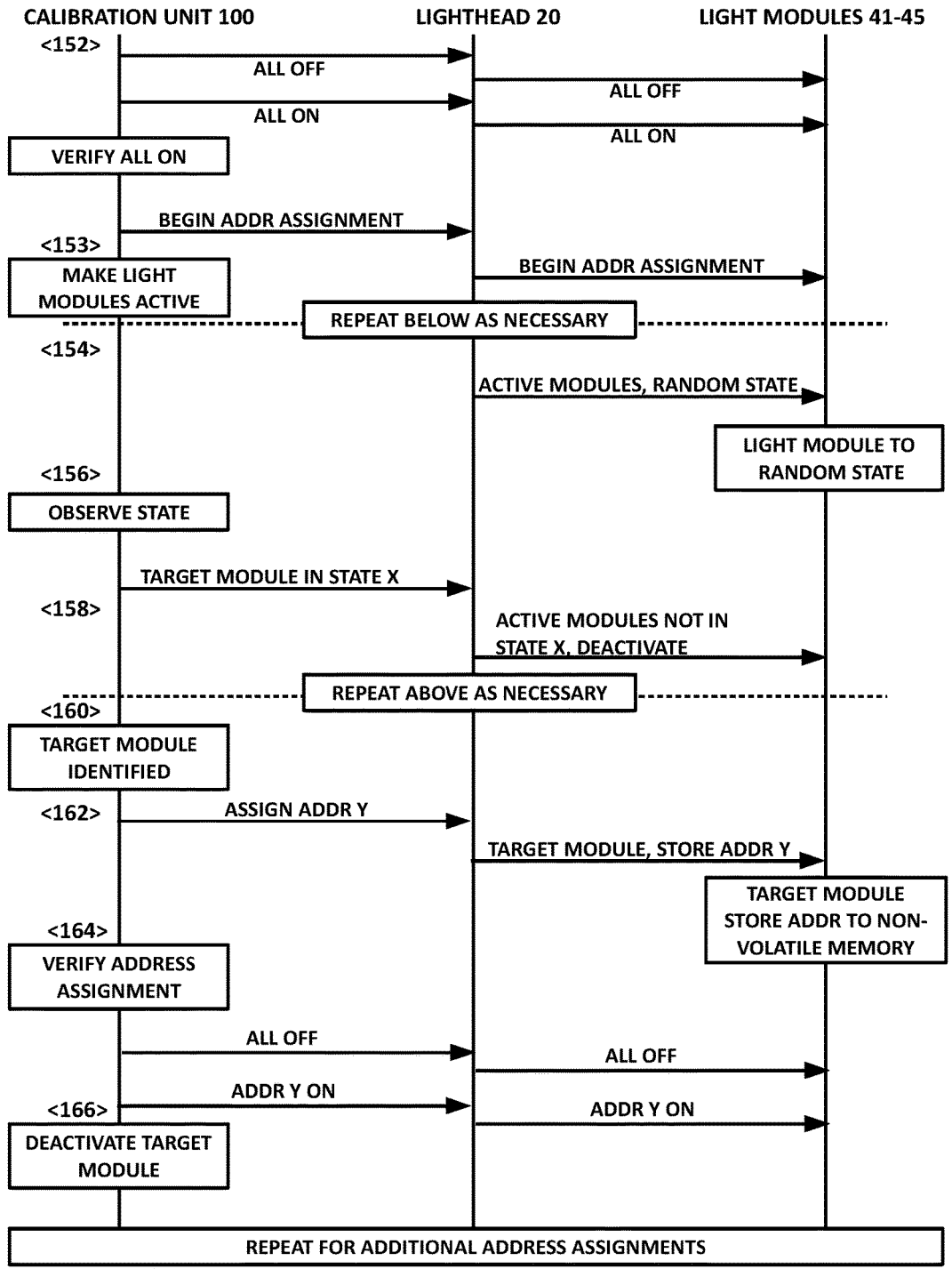
FIG. 4 is a sequence diagram of the address assignment method shown in FIG. 3.
Figure 5:
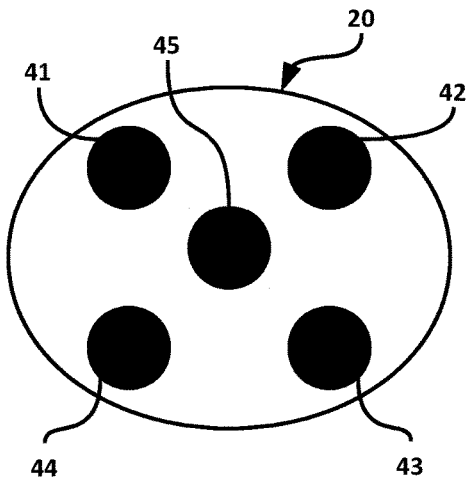
FIGS. 5-10 show the state of light modules of a lighthead during a process of assigning an address to one of the light modules using the iterative elimination process.

An address assignment method 150 that uses an iterative elimination process to assign addresses to the light modules will now be described with reference to FIGS. 3-4 and 5-10. FIG. 3 provides a flow chart of method 150 and FIG. 4 provides a sequence diagram of method 150. For greater clarity, the step numbers shown in FIG. 3 are also referenced in FIG. 4. FIGS. 5-10 illustrate the state of each light module of a lighthead using method 150 to assign an address to light module 45.

For the purpose of describing address assignment method 150, it is assumed solely for the sake of simplicity that light modules 41-45 have only two (2) operating states (i.e., OFF and ON). However, as will be discussed in detail below, it should be appreciated that light modules 41-45 may have more than two (2) operating states.

Figure 6:
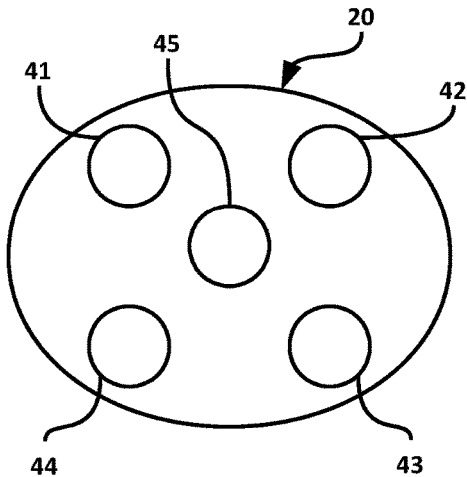

Assignment of an address to a selected target light module (i.e., light module 45) will now be described. As an initialization step (step 152), control system 104 of calibration unit 100 transmits an instruction to lighthead 20 commanding all light modules 41-45 to the OFF state (FIG. 5), followed by transmission of an instruction to lighthead 20 commanding all of the light modules 41-45 to the ON state (FIG. 6). Instructions sent to lighthead 20 via common bus 30 are received by the control unit of each light module 41-45, which in turn, controls the LEDs (i.e., turns the LEDs OFF and then ON). Sensing device 106 of calibration unit 100 is used to verify that all light modules 41-45 are in the commanded OFF or ON state, thereby confirming that all of the light modules 41-45 are operating properly.

Figure 7:
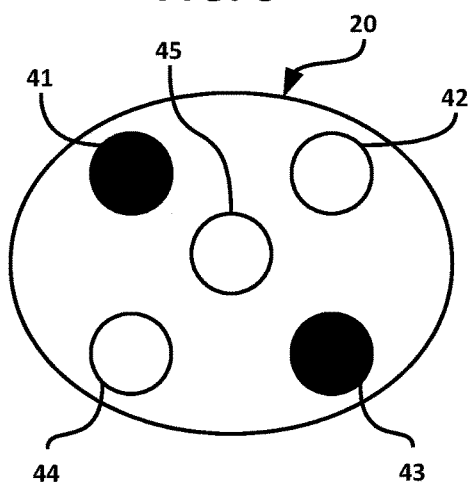

Next, all of the light modules that need address assignments are made active (step 153). Light modules are active if they are considered for address assignment by control system 104 of calibration unit 100. In step 154, control system 104 transmits an instruction to lighthead 20 commanding each active light module 41-45 to select a random operating state (i.e., ON state or OFF state). Accordingly, the control units of each light module 41-45 receives the instruction from control system 104, and commands all of LEDs associated therewith to either an ON state or an OFF state (FIG. 7). In FIG. 7, light modules 41 and 43 have been randomly set to the OFF state (i.e., all associated LEDs are turned OFF), while light modules 42, 44, and 45 have been randomly set to the ON state (i.e., all associated LEDs are turned ON).

Sensing device 106 detects the current operating state (State X) of light module 45 (step 156). In the illustrated example shown in FIG. 7, State X is in the ON state. All active light modules 41-45 that do not match State X (i.e., the ON state) are deactivated and thereby removed from consideration in address assignment process 150 (step 158). Deactivated light modules are shown in the figures with an "X." When a light module is deactivated, control system 104 no longer considers the state of the associated LEDs as detected by sensing device 106. Accordingly, light modules that are deactivated are removed from consideration in the address assignment method.

Figure 8:
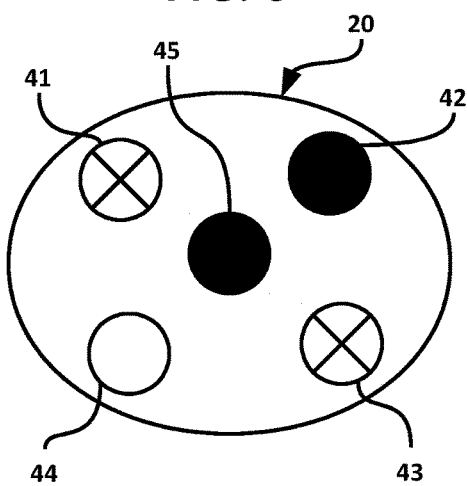

Next, it is determined whether the target light module (i.e., light module 45) is the only remaining active light module of lighthead 20 (step 160). In the illustrated example, there remain three (3) active light modules, i.e., light modules 42, 44, and 45. Therefore, address assignment method 150 returns to step 154, and all active light modules are again set to a random state. As shown in FIG. 8, the target light module (i.e., light module 45) and light module 42 have been randomly set to the OFF state, while light module 44 has been randomly set to the ON state. The current state (State X) of light module 45 is detected (step 156), and State X is determined to be the OFF state. Accordingly, light module 44, which does not match State X, is deactivated (step 158). At step 160 it is determined whether the target light module (i.e., light module 45) remains the only active light module. Since two light modules (i.e., light modules 42 and 45) remain active, address assignment method 150 returns once again to step 154.

Figure 9:
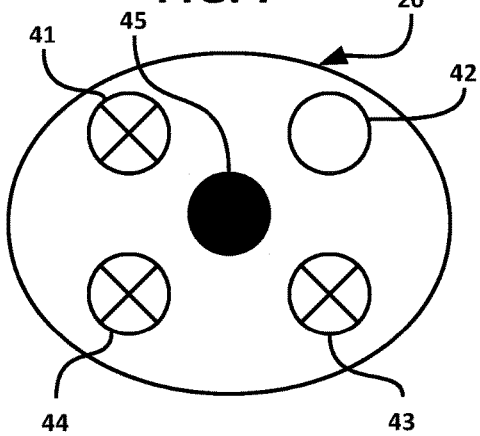
Figure 10:
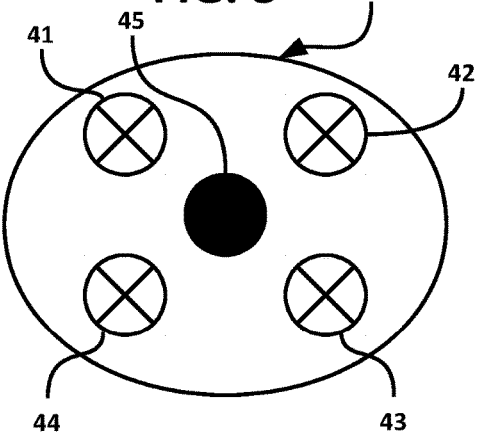

The light modules 42 and 45 are again set to a random state. As shown in FIG. 9, the target light module (i.e., light module 45) has been randomly set to the OFF state, while light module 42 has been randomly set to the ON state. The current state (State X) of light module 45 is detected (step 156), and State X is determined to be the OFF state. Accordingly, light module 42, which does not match State X, is deactivated (step 158), as shown in FIG. 10.

At step 160, it is determined that the target light module (i.e., light module 45) is the only active light module of lighthead 20. Accordingly, address assignment method 150 proceeds to step 162, where address Y is assigned to light module 45. In this regard, address Y is stored in non-volatile memory of the control unit of light module 45. Next, the address assignment of light module 45 is verified by first setting all of the light modules 41-45 to the OFF state, and then setting only light module 45 to the ON state by sending an instruction with address Y. If sensing device 106 only detects light module 45 as being in the ON state, then the address assignment has been successful. At step 166, light module 45 is deactivated for the purpose of any further address assignments. Accordingly, as each target light module is assigned an address, it is deactivated to remove it from any subsequent processing steps for assigning addresses to the other light modules.

If it is determined at step 168 that all of the light modules 41-45 have been assigned addresses, then address assignment method 150 ends. Otherwise, address assignment method 150 returns to step 153 to assign an address to another target light module. Accordingly, steps 153-168 of address assignment method 150 are repeated to assign addresses to the remaining light modules 41-44.

As mentioned above, light modules 41-45 may have more than two (2) operating states. These additional operating states may involve various lighting parameters of the light modules, including, but not limited to, light intensity level, color, color temperature, blinking rate, and pulsing frequency. Therefore, it is contemplated that address assignment method 150 may be implemented using a combination of the operating states relating to various lighting parameters. For example, the operating states used in the address assignment method 150 could include the following nine (9) operating states:

STATE 1: OFF
STATE 2: ON/light intensity level 1/warm color
STATE 3: ON/light intensity level 1/cool color
STATE 4: ON/light intensity level 2/warm color
STATE 5: ON/light intensity level 2/cool color
STATE 6: ON/light intensity level 3/warm color
STATE 7: ON/light intensity level 3/cool color
STATE 8: ON/light intensity level 4/warm color
STATE 9: ON/light intensity level 4/cool color In the foregoing example, the random state for each light module is selected from one of nine (9) unique operating states. As will be appreciated, with a sufficiently large number of unique operating states, the number of iterations needed to assign addresses to each light module can be significantly reduced, thereby speeding the address assignment process.

Figure 11:
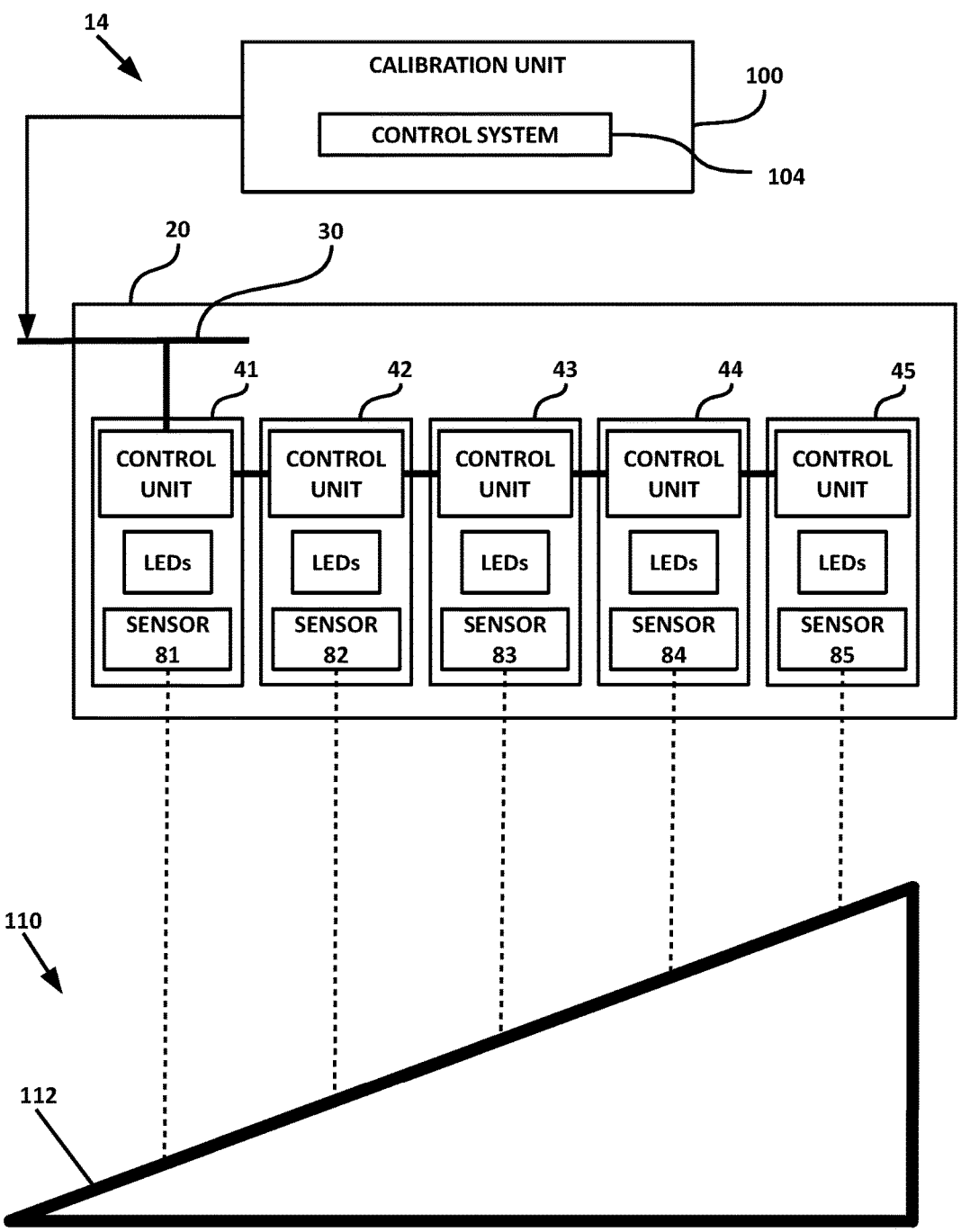
FIG. 11 is a block diagram of an address assignment system for assigning addresses to a plurality of light modules, according to an alternative embodiment of the present invention.

Referring now to FIG. 11, an alternative embodiment of the present invention will be described. Address assignment system 14 is comprised of a calibration unit 100 having a control system 104, and a calibration plank 110 having a sloping front face 112.

As indicated above, each light module of a lighthead 20 may also include one or more sensors (e.g., light and/or distance sensors). In the embodiment shown in FIG. 11, each light module 41-45 of lighthead 20 includes a respective distance sensor 81-85. Each distance sensor 81-85 is connected to the respective control unit of the light module. As can be seen in FIG. 11, a unique distance is provided between front face 112 of calibration plank 110 and each sensor 81-85. The distances detected between sensors 81-85 and front face 112 of calibration plank 100 are used to assign an address to each light module 41-45.

In accordance with this embodiment of the present invention, control system 104 of calibration unit 100 stores an assigned address in the non-volatile memory of the control units of light modules 41-45 based upon the distance sensed by the associated distance sensor 81-85. Accordingly, unique readings from distance sensors 81-85 are used to assign addresses to light modules 41-45.

Figure 12:
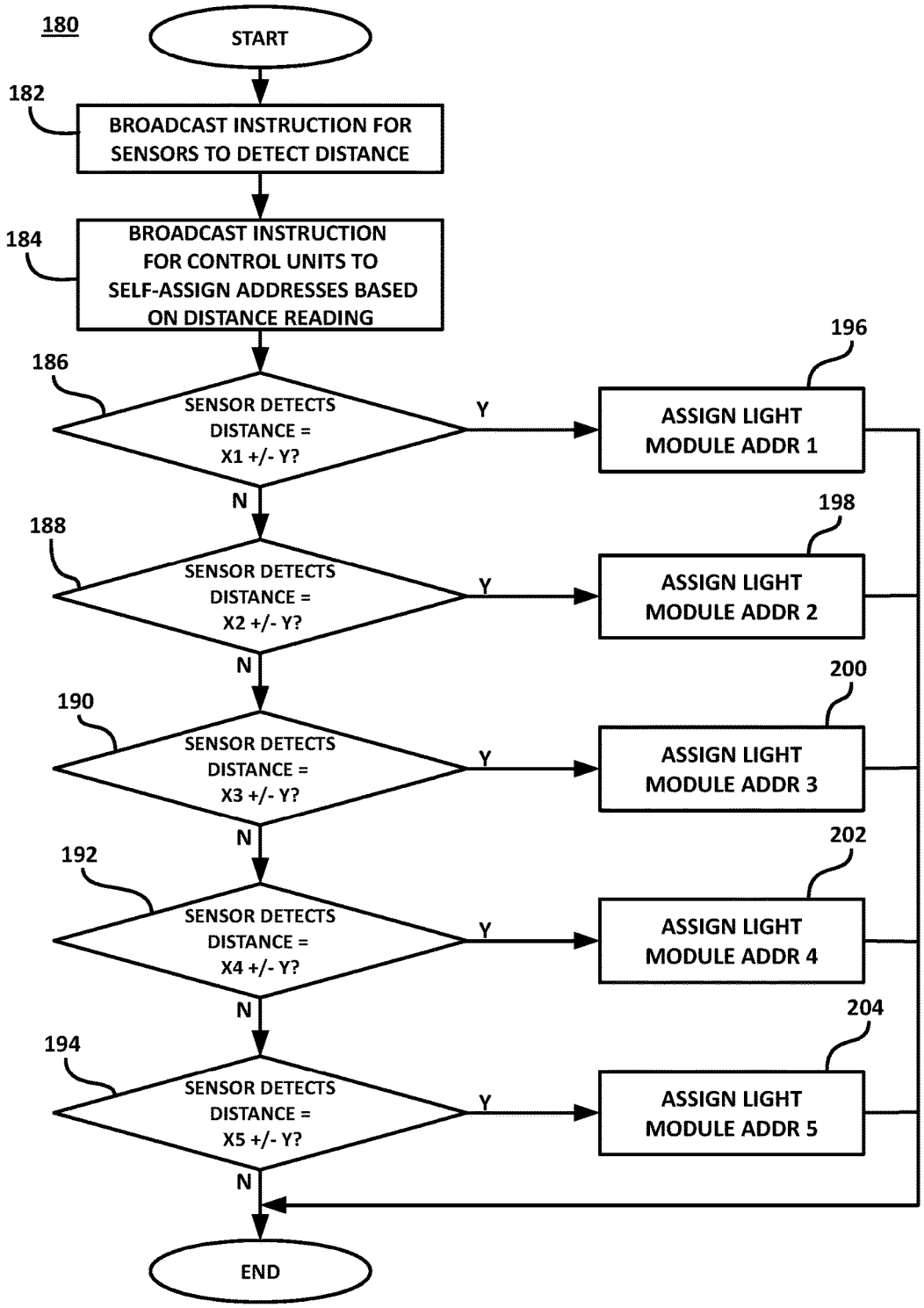
FIG. 12 is a flow chart of an address assignment method according to the alternative embodiment of the present invention.

Referring now to FIG. 12, there is shown a flow chart illustrating the steps of address assignment method 180 according to the alternative embodiment of the present invention. Control system 104 transmits instructions via common bus 30 that are received by the control units of light modules 41-45. A first instruction is broadcast to the control units of light modules 41-45 commanding the control units to have respective sensors 81-85 take a distance reading (step 182). At step 184, control system 104 broadcasts an instruction to the control units that commands the control units to self-assign an address based upon the value of the distance reading detected by the sensors 81-85. For example, the instruction may command the control units to self-assign an address, as follows:

If sensor detects a distance of 2.5 m+/−0.1 m to front face 112, then self-assign address 1 by storing address 0000 in the non-volatile memory of the control unit (steps 186, 196).

If sensor detects a distance of 2.0 m+/−0.1 m to front face 112, then self-assign address 2 by storing address 0001 in the non-volatile memory of the control unit (steps 188, 198).

If sensor detects a distance of 1.5 m+/−0.1 m to front face 112, then self-assign address 3 by storing address 0010 in the non-volatile memory of the control unit (steps 190, 200).

If sensor detects a distance of 1.0 m+/−0.1 m to front face 112, then self-assign address 4 by storing address 0011 in the non-volatile memory of the control unit (steps 192, 202).

If sensor detects a distance of 0.5 m+/−0.1 m to front face 112, then self-assign address 5 by storing address 0100 in the non-volatile memory of the control unit (steps 194, 204).

The distances from the sensor to front face 112 of calibration plank 110 are pre-stored in the memory of control system 104. These pre-stored distances are inserted into the instruction broadcast to the control units for self-assigning addresses to light modules 41-45.

It should be appreciated that the distance values provided above are solely for the purpose of illustrating an embodiment of the present invention, and are not intended to limit same. Moreover, the number of light modules in lighthead 20 may vary from those shown in the illustrated embodiment shown in FIG. 11. Furthermore, the same address can be self-assigned to multiple light modules by physically modifying front face 112 of calibration plank 110, and thereby provide the same distance to multiple sensors. By assigning the same address to more than one light module, a group of two or more light modules will respond to an instruction identifying that address.

In the embodiments of the present invention illustrated in FIGS. 2 and 11 light modules 41-45 are shown as being directly connected to common bus 30. It should be appreciated that lighthead 20 may also include a supervisory controller that is connected between light modules 41-45 and common bus 30. Accordingly, light modules 41-45 are not directly connected to common bus 30, and calibration unit 100 communicates with light modules 41-45 via the supervisory controller.

The foregoing describes specific embodiments of the present invention. It should be appreciated that these embodiments are described for purposes of illustration only, and that numerous alterations and modifications may be practiced by those skilled in the art without departing from the spirit and scope of the invention. For example, it is contemplated that the address assignment system and method of the present invention may be used to assign addresses to components other than those of a surgical lighthead. The present invention finds utility in any system where a common bus is shared for communications with a plurality of components. It is intended that all such modifications and alterations be included insofar as they come within the scope of the invention as claimed or the equivalents thereof.

Having described the invention, the following is claimed:

1. A method for assigning addresses to a plurality of components sharing a common bus, wherein each component has at least two operating states, said method comprising:
    (a) establishing all components needing an address assignment as active components;
    (b) selecting a target component among the plurality of components that is to be assigned an address for communication therewith;
    (c) setting all active components to a random state by transmitting an instruction to the plurality of components to select a random state;
    (d) detecting the current state of the target component, wherein the current state is established as state X;
    (e) deactivating all of the components that do not match state X, wherein deactivated components are removed from evaluation for address assignment; and
    (f) determining if the target component is the only remaining active component among the plurality of components, wherein
        (i) if the target component is the only remaining active component, then assigning an address to the target component, deactivating the target component, and repeating steps (a)-(f) for components still needing an address assignment, and
        (ii) if the target component is not the only remaining active component, then repeating steps (c)-(f).

2. The method for assigning addresses according to claim 1, wherein the component is a light module of a lighthead, each light module having a control unit and LEDs.

3. The method for assigning addresses according to claim 2, wherein the assigned address is stored in a non-volatile memory of the control unit of the component.

4. The method for assigning addresses according to claim 2, wherein the states of the component are operating states of the lighthead.

5. The method for assigning addresses according to claim 4, wherein the operating states include one of more lighting parameters of the lighthead.

6. The method for assigning addresses according to claim 5, wherein said lighting parameters include at least one of: ON/OFF, light intensity level, color, color temperature, blinking rate, and pulsing frequency.

7. The method for assigning addresses according to claim 1, wherein the state of a component is determined by an image sensor.

8. A system for assigning addresses to a plurality of light modules sharing a common bus, said system comprising:
    a calibration unit having a control system and a sensing device for detecting at least one lighting parameter of the plurality of light modules, the calibration unit programmed to:
        (a) establish all light modules needing an address assignment as active light modules;

(b) select a target light module among the plurality of light modules that is to be assigned an address for communication therewith;
(c) set all active light modules to a random state by transmitting an instruction to the plurality of light modules to select a random state, wherein each state includes one or more lighting parameters;
(d) detect the current state of the target light module, wherein the current state is established as state X;
(e) deactivate all of the light modules that do not match state X, wherein deactivated light modules are removed from evaluation for address assignment; and
(f) determine if the target light module is the only remaining active light module among the plurality of light modules, wherein
   (i) if the target light module is the only remaining active light module, then assigning an address to the target light module, deactivating the target light module, and repeating steps (a)-(f) for light modules still needing an address assignment, and
   (ii) if the target light module is not the only remaining active light module, then repeating steps (c)-(f).

9. The system for assigning addresses according to claim 8, wherein each light module has a control unit and LEDs.

10. The system for assigning addresses according to claim 9, wherein the assigned address is stored in a non-volatile memory of the control unit of the light module.

11. The system for assigning addresses according to claim 8, wherein said lighting parameters include at least one of: ON/OFF, light intensity level, color, color temperature, blinking rate, and pulsing frequency.

12. The system for assigning addresses according to claim 8, wherein the sensing device includes an image sensor.

* * * * *